United States Patent
Chen et al.

(10) Patent No.: US 6,327,250 B1
(45) Date of Patent: Dec. 4, 2001

(54) METHOD AND APPARATUS FOR SUPRESSING CROSSTALK BETWEEN DATA AND MONITORING CHANNEL IN AN OPTICAL COMMUNICATION SYSTEM

(75) Inventors: Chien-Jen Chen, Edison; Alexei N. Pilipetskii; Ekaterina A. Golovchenko, both of Colts Neck, all of NJ (US)

(73) Assignee: TyCom (US) Inc., Morristown, NJ (US)

( * ) Notice: Subject to any disclaimer, the term of this patent is extended or adjusted under 35 U.S.C. 154(b) by 0 days.

(21) Appl. No.: 09/217,320

(22) Filed: Dec. 21, 1998

(51) Int. Cl.⁷ ............................ H04B 10/08
(52) U.S. Cl. .................. 370/241; 359/110; 359/177
(58) Field of Search ...................... 370/241, 242, 370/249, 252; 359/110, 113, 114, 115, 118, 119, 177

(56) References Cited

U.S. PATENT DOCUMENTS

| | | | | |
|---|---|---|---|---|
| 4,586,186 | * | 4/1986 | Anderson | 370/522 |
| 4,633,464 | * | 12/1986 | Anderson | 370/522 |
| 5,654,816 | * | 8/1997 | Fishman | 359/177 |
| 5,960,833 | * | 10/1999 | Jensen | 359/110 |
| 6,124,960 | * | 9/2000 | Garthe et al. | 359/181 |

* cited by examiner

Primary Examiner—Ricky Ngo

(57) ABSTRACT

A method and apparatus is provided for monitoring an optical transmission path through an optical transmission system supporting bidirectional communication between first and second terminals along first and second optical transmission paths. The first transmission path includes at least one optical amplifier located therein. In accordance with the method, a test signal is generated, which is formed by a superposition of first and second optical tones located at first and second wavelengths, respectively. The first and second wavelengths are within the bandwidth of the optical amplifier. The amplitude and phase of the first and second optical tones are arranged so that the test signal has a substantially constant intensity over a modulation cycle of the first and second optical tones. The test signal is transmitted from the first terminal along the first optical transmission path and through the optical amplifier. A portion of the test signal is received at the first terminal after it traverses the optical amplifier, an optical loop-back path, and a second transmission path. The received portion of the test signal may be compared to a delayed rendition of the generated test signal to assess transmission path performance.

26 Claims, 2 Drawing Sheets

INITIAL
INTENSITY
LEVEL

METHOD AND APPARATUS FOR SUPRESSING CROSSTALK BETWEEN DATA AND MONITORING CHANNEL IN AN OPTICAL COMMUNICATION SYSTEM

FIELD OF THE INVENTION

The present invention relates generally to a line monitoring system employed in an optical communication system, and more specifically to a line monitoring system in which crosstalk is suppressed between the monitoring channel and the data channels.

BACKGROUND OF THE INVENTION

In long distance fiber optic communication systems it is important to monitor the health of the system. For example, monitoring can be used to detect faults or breaks in the fiber optic cable, faulty repeaters or amplifiers or other problems with the system.

Prior art monitoring techniques include the use of a testing system which generates a test signal and modulates the test signal onto a single channel (or wavelength) with the transmitted data signal. For example, the data signal may be amplitude modulated by the test signal. A loop-back coupler within an optical amplifier or repeater located downstream is used to return a portion of the transmitted signal (data signal plus test signal modulation) to the testing system. The testing system then separates the test signal from the data signal and processes the test signal to examine the health of the transmission system. U.S. Pat. Nos. 4,586,186 and 4,633,464 to C. Anderson et al. discloses a similar technique to modulate test response information from a repeater onto the main data signal to monitor the health of the system.

One problem that arises from the use of an amplitude modulated test signal is that crosstalk is generated between the test signal and data channels. It has been determined that the crosstalk increases as the frequency separation between the test signal and the data channels increase. That is, data channels nearest the test signal exhibit the least crosstalk while data channels farthest from the test signal exhibit the greatest crosstalk. Moreover, crosstalk occurs among data channels that are both greater and less than the frequency of the test signal. Based on these observations, the source of the crosstalk is Raman gain that results in a transfer of power between the test signal and the data channels.

Accordingly, it would be desirable to reduce the cross talk that arises between the test signal and the data channels in a wavelength division multiplexed optical communication system.

SUMMARY OF THE INVENTION

The present invention provides a method and apparatus for monitoring an optical transmission path through an optical transmission system supporting bi-directional communication between first and second terminals along first and second optical transmission paths. The first transmission path includes at least one optical amplifier located therein. In accordance with the method, a test signal is generated, which is formed by a superposition of first and second optical tones located at first and second wavelengths, respectively. The first and second wavelengths are within the bandwidth of the optical amplifier. The amplitude and phase of the first and second optical tones are arranged so that the test signal has a substantially constant intensity over a modulation cycle of the first and second optical tones. The test signal is transmitted from the first terminal along the first optical transmission path and through the optical amplifier. A portion of the test signal is received at the first terminal after it traverses the optical amplifier, an optical loop-back path, and a second transmission path. The received portion of the test signal may be compared to a delayed rendition of the generated test signal to assess transmission path performance.

The present invention advantageously employs a test signal with a constant intensity so that the Raman gain transferred between the test signal and any given data channel will also be constant. By suppressing the intensity variations in the data channels in this manner crosstalk between the test signal and the data channels will not arise.

DETAIL DESCRIPTION

Figure 1:
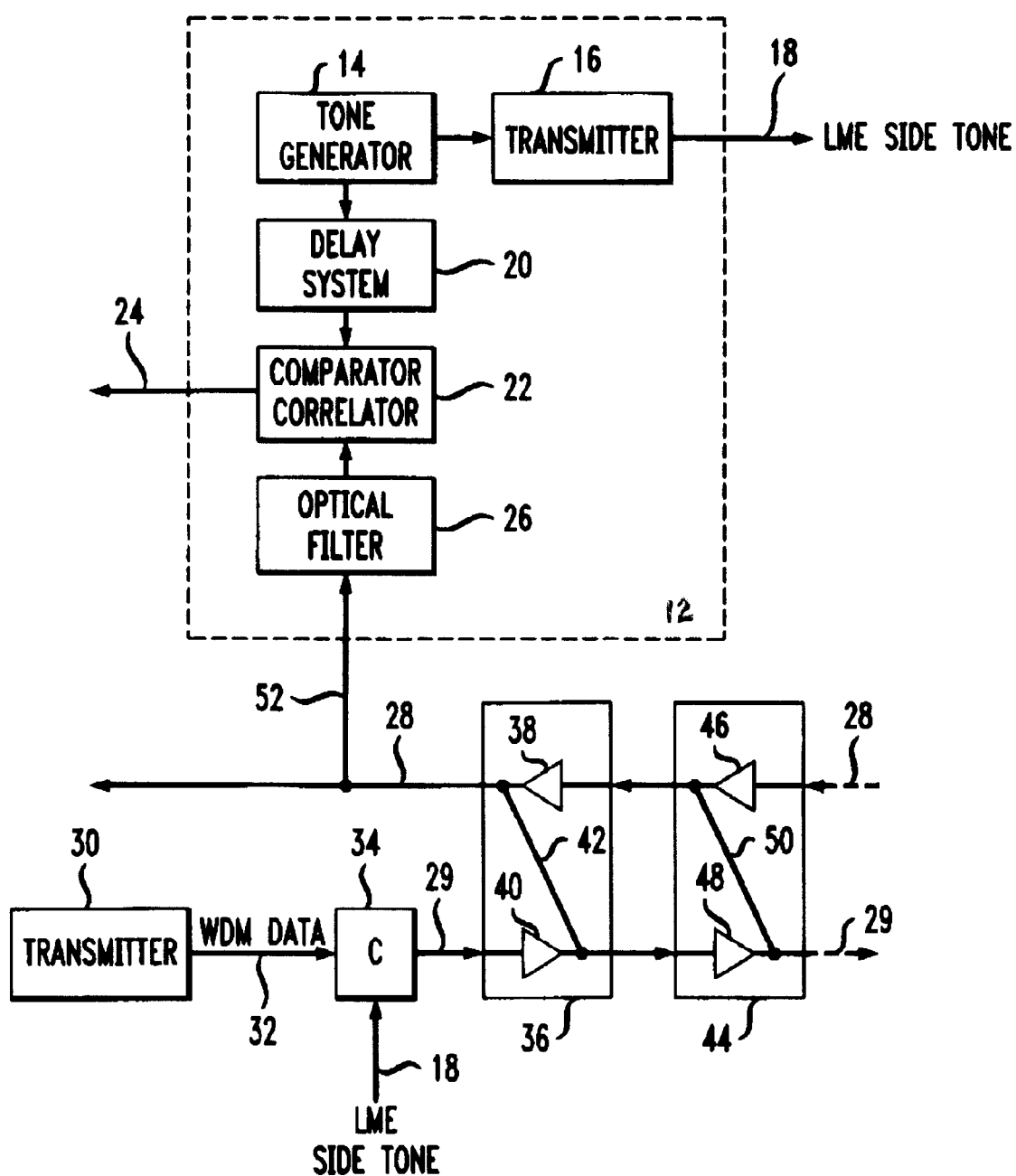
FIG. 1 illustrates a monitoring system 10 in accordance with the present invention.

FIG. 1 illustrates a monitoring system 10 in accordance with the present invention. Monitoring system 10 includes line monitoring equipment (LME) 12 for monitoring the health of a telecommunications transmission system, such as a fiber optic transmission system. LME 12 includes pseudo-random sequence (PRS) tone generator 14 connected to laser transmitter 16 for generating and outputting a pseudo-random sequence of tones. Laser transmitter 16 generates a low level AM test signal 18 based on the tones generated by PRS tone generator 14.

LME 12 also includes a delay system 20 connected to PRS tone generator 14 for delaying the tones received from PRS tone generator 14. LME 12 further includes an optical filter 26 for selectively transmitting one or more wavelengths or channels, while blocking the transmission of other wavelengths.

Comparator/correlator 22 is connected to delay system 20 and optical filter 26. Comparator/correlator 22 correlates the outputs of optical filter 26 and delay system 20 using well known digital signal processing techniques. Comparator/correlator 22 outputs a result 24 of the correlation operation which is used by a computer or other systems (not shown) to diagnose faults or problems in the optical transmission system.

LME 12 is connected to a portion of an optical transmission system. The optical transmission system includes a laser transmitter 30 and an optical fiber pair, including fibers 28 and 29, for carrying optical signals. Fibers 28 and 29 can be the long distance optical fiber lines for deployment, for example, under the ocean. Optical fibers 28 and 29 are unidirectional fibers and carry signals in opposite directions. Fibers 28 and 29 together provide a bidirectional path for transmitting signals. While the monitoring system according to a disclosed embodiment of the present invention monitors a transmission system that includes two unidirectional fibers 28 and 29, the present invention may be used to monitor transmission systems employing a single bidirectional fiber.

Laser transmitter 30 transmits optical data on a plurality of channels (or wavelengths) over fiber 29. Laser transmitter 30 can comprise a plurality of laser transmitters each transmitting an optical data signal over fiber 29 using a different channel or wavelength. A plurality of data signals each at a different wavelength are sent over fiber 29 using wavelength division multiplexing (WDM). Alternatively, only a single channel of data may be carried on fiber 29. Similarly WDM data signals may be carried over fiber 28, but traveling in a direction opposite of those signals on fiber 29.

A coupler 34 combines the WDM data 32 from transmitter 30 and the LME tone 18 from transmitter 16 and outputs this combined signal for transmission onto fiber 29. A first optical repeater 36 receives the combined signal from coupler 34. Repeater 36 includes amplifiers 38 and 40 for amplifying optical signals transmitted over fiber 28 and 29, respectively. Repeater 36 also includes a loop-back coupler 42, which returns a portion of the signal being transmitted on fiber 29 to fiber 28 for transmission to LME 12. Similarly, a second optical repeater 44 includes amplifiers 46 and 48 and loop-back coupler 50. Additional optical repeaters, including their associated loop-back couplers, are connected to fibers 28 and 29 for periodically amplifying and returning signals thereon.

Signal 52 is connected to the end of fiber 28 and carries all signals present on fiber 28, including the combined WDM data 32 and the amplitude modulated tones 18 returned by loop-back couplers 42 and 50 returned over fiber 28. Signal 52 is input to optical filter 26. Optical filter 26 is wavelength selective and passes only the wavelength of LME test tone 18. Comparator/correlator 22 then correlates the returned LME tone with the delayed PRS tones. Comparator/correlator 22 may correlate electrical signals or optical signals. Where comparator/correlator 22 correlates electrical signals, LME 12 further includes an optical decoder connected between optical filter 26 and the comparator/correlator 22 for converting the optical signals output by filter 26 into electrical signals.

Comparator/correlator 22 correlates the PRS tones output by the PRS tone generator 14 with each of the returned LME test tones. To perform this correlation, delay system 20 receives the PRS tones from the PRS tone generator 14 and outputs a plurality of delayed PRS tones to comparator/correlator 22. Delay system 20 outputs each PRS tone after the time delays corresponding to each repeater. In other words, delay system 20 delays the PRS tones based on the location of each repeater. This process is repeated for each PRS tone received by the delay system 20. Comparator/correlator 22 compares or correlates the delayed LME tone returned from each repeater with correspondingly delayed PRS tones generated by PRS tone generator 14.

Figure 2A:
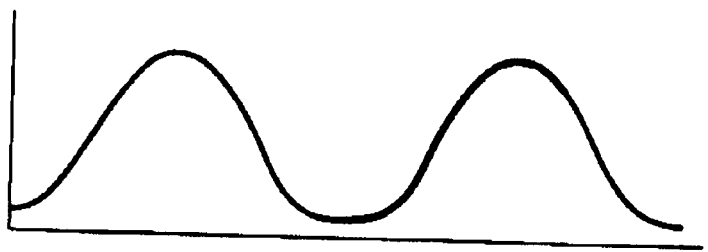
FIG. 2(a) shows the intensity variations of an amplitude modulated test tone 18 such as employed in a known monitoring system.
Figure 2B:
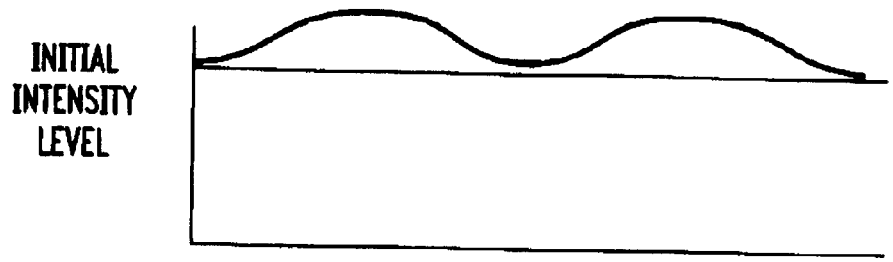
FIG. 2(b) shows the intensity variations in the data signal as a result of Raman gain arising from the modulated tone shown in FIG. 2(a).

As previously mentioned, it has been found that crosstalk arises between the amplitude modulated test tone 18 and the data channels 32. The crosstalk curve begins at a frequency shift (i.e., the frequency difference between the tone 18 and a given data channel) of zero and increases as the frequency shift increases. FIG. 2(a) shows the intensity of the amplitude modulated tone 18 over time. The period or frequency of the amplitude modulation is slow with respect to the bit rate that is supported on the data channels. FIG. 2(b) shows the resulting intensity variation in the data signal as a result of the modulated tone 18. As shown, the intensity variations in the data signal correspond in period and phase to the modulations in the tone 18. This crosstalk between the modulated tone 18 and a given data channel or signal such as shown in FIG. 2(b) is a result of Raman gain.

More specifically, for a frequency range up to a channel spacing of 40 nm the Raman gain $g(\Delta v)$ can be approximated by $g(\Delta v)=\alpha\Delta\lambda$. The crosstalk between the test tone 18 having an intensity $I_s$ and the data channel having an intensity $I_d$ can be described as follows:

$$dI_d/d_z = g(\Delta\lambda)\, I_d I_s = \alpha\Delta\lambda I_d I_s$$

The resulting intensity modulation of the data channel due to Raman crosstalk, assuming that the tone 18 is 100% modulated, is proportional to $\alpha\Delta\lambda I_s L$, where L is the transmission distance to the optical amplifier.

In accordance with the present invention, the crosstalk can be suppressed by employing a second modulated tone 15 in addition to modulated tone 18. The tones 15 and 18 are close in frequency, preferably not exceeding the channel spacing. The minimum separation between tones 15 and 18 will in practice be limited by the available filters. The tones 15 and 18 add together so that the total intensity of the resulting tone is constant over time. By employing a test signal with constant intensity the Raman gain transferred between the test signal and any given data channel will also be constant. Accordingly, the intensity variations in the data channels, such as shown in FIG. 2(b) will be suppressed. That is, amplitude modulation, and hence crosstalk, will not be transferred from the tones 15 and 18 to the data channels.

Figure 3:
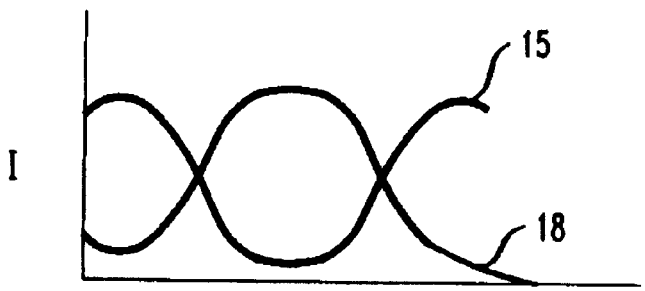
FIG. 3 shows the amplitude and phase of the first and second modulated tones.

To provide a test signal with a constant intensity, individual tones 15 and 18 may be selected so that they have the same amplitudes and are out of phase by 180 degrees with respect to one another. This relationship is shown in FIG. 3. More quantitatively, the Raman crosstalk between the data channel and the test tone 18 is $\alpha\Delta\lambda_1 I_1 L$, where $\Delta\lambda_1$ is the separation between the data channel and tone 18 and $I_1$ is the intensity of the tone 18. Similarly, the Raman crosstalk between the data channel and the test tone 15 is $\alpha\Delta\lambda_2 I_2 L$, where $\Delta\lambda_2$ is the separation between the data channel and tone 15 and $I_2$ is the intensity of the tone 15. Assuming $I_1=I_2$, the net Raman crosstalk due to the phase difference between tones 15 and 18 is $\alpha(\Delta\lambda_1-\Delta\lambda_2)\,I_s L = \alpha\Delta\lambda_{12} I_s L$, where $\Delta\lambda_{12}$ is the spectral separation between tones 15 and 18. Thus, the amount by which the crosstalk is suppressed is proportional to $\Delta\lambda_{12}/\Delta\lambda$, which is the ratio between the spectral separation of tones 15 and 18 and the spectral separation between the test tone and the data channel.

To ensure that the walk-off between tones 15 and 18 will be small, the following condition should be fulfilled:

$$T_{mod} << <D> L \Delta\lambda$$

where $T_{mod}$ is the walk-off, $<D>$ is the dispersion, L is the distance between the transmitting terminal and the repeater from which data is being received, and $\Delta\lambda$ is the difference in wavelength between tones 15 and 18. For example, if $<D>=1$ ps, $L=10,000$ km, and $\Delta\lambda=0.8$ nm, the walk off is $T=10$ ns.

What is claimed is:

1. A method for monitoring an optical transmission path through an optical transmission system supporting bi-directional communication between first and second terminals along first and second optical transmission paths, said first transmission path including an optical amplifier located therein, said method comprising the steps of:
   a. generating a test signal that is formed by superposition of first and second optical tones located at first and second wavelengths, respectively, within the bandwidth of the optical amplifier;
   b. arranging an amplitude and phase of said first and second optical tones such that said test signal has a substantially constant intensity over a modulation cycle of said first and second optical tones;

c. transmitting from the first terminal said test signal along the first optical transmission path and through the optical amplifier;

d. receiving at the first terminal a portion of the test signal after it traverses the optical amplifier, an optical loop-back path, and a second transmission path.

2. The method of claim 1 further comprising the step of comparing the received portion of the test signal to a delayed rendition of the generated test signal to assess transmission path performance.

3. The method of claim 2 wherein delay of the delayed rendition of the test signal is based on the distance along the first transmission path between the first terminal and optical amplifier.

4. The method of claim 1 wherein the step of transmitting the test signal includes the step of wavelength division multiplexing the test signal with a data channel.

5. The method of claim 4 wherein said data channel includes a plurality of WDM channels.

6. The method of claim 4 wherein the step of receiving the test signal includes the step of selectively filtering out the data channel so that only the test signal is received.

7. The method of claim 2 wherein said comparison is performed in the electrical domain.

8. The method of claim 2 wherein said comparison is performed in the optical domain.

9. The method of claim 1 wherein a spectral separation between said first and second wavelengths is less than a spectral separation between said test signal and said data channel.

10. The method of claim 1 wherein said amplitude of said first and second optical tones are approximately equal and said first and second optical tones are approximately 180 degrees out of phase with respect to one another.

11. The method of claim 1 wherein walk-off between said first and second optical tones is below a prescribed amount.

12. The method of claim 11 wherein said prescribed amount is less than the product of a wavelength separation between said first and second tones, a distance between the first terminal and the optical amplifier, and an average dispersion value.

13. An apparatus for monitoring an optical transmission path through an optical transmission system supporting bidirectional communication between first and second terminals along first and second optical transmission paths, said first transmission path including an optical amplifier located therein, said apparatus comprising:

an optical source generating a test signal that is formed by superposition of first and second optical tones located at first and second wavelengths, respectively, within the bandwidth of the optical amplifier, wherein said optical source arranges an amplitude and phase of said first and second optical tones such that said test signal has a substantially constant intensity over a modulation cycle of said first and second optical tones;

a coupler directing said test signal along the first optical transmission path and through the optical amplifier;

a correlator receiving at the first terminal a portion of the test signal after it traverses the optical amplifier, an optical loop-back path, and a second transmission path and comparing the received portion of the test signal to a delayed rendition of the generated test signal to assess transmission path performance.

14. The apparatus of claim 13 wherein delay of the delayed rendition of the test signal is based on the distance along the first transmission path between the first terminal and optical amplifier.

15. The apparatus of claim 13 wherein the coupler multiplexes the test signal with a data channel.

16. The apparatus of claim 15 wherein said coupler is a WDM coupler.

17. The apparatus of claim 15 wherein said data channel includes a plurality of WDM channels.

18. The apparatus of claim 15 further comprising an optical filter for selectively filtering out the data channel so that only the test signal is received by the correlator.

19. The apparatus of claim 13 wherein said correlator operates in the electrical domain.

20. The apparatus of claim 13 wherein said correlator operates in the optical domain.

21. The apparatus of claim 13 wherein a spectral separation between said first and second wavelengths is less than a spectral separation between said test signal and said data channel.

22. The apparatus of claim 13 wherein said amplitude of said first and second optical tones are approximately equal and said first and second optical tones are approximately 180 degrees out of phase with respect to one another.

23. The apparatus of claim 13 wherein walk-off between said first and second optical tones is below a prescribed amount.

24. The apparatus of claim 23 wherein said prescribed amount is less than the product of a wavelength separation between said first and second tones, a distance between the first terminal and the optical amplifier, and an average dispersion value.

25. The method of claim 1 wherein said first and second optical tones are modulated in a pseudo-random sequence.

26. The apparatus of claim 13 wherein said optical source modulates said first and second tones in a pseudo-random sequence.

* * * * *